United States Patent [19]

Robertson

[11] Patent Number: 4,875,377

[45] Date of Patent: Oct. 24, 1989

[54] FLOWMETERS

[75] Inventor: Robert A. Robertson, Hereford, United Kingdom

[73] Assignee: Spirax Sarco Limited, United Kingdom

[21] Appl. No.: 115,054

[22] Filed: Oct. 30, 1987

[51] Int. Cl.$^4$ .............................................. G01F 1/22
[52] U.S. Cl. ............................ 73/861.02; 73/861.53; 73/861.76
[58] Field of Search .......... 73/861.02, 861.03, 861.53, 73/861.58, 861.62, 861.75, 861.76; 336/135

[56] References Cited

U.S. PATENT DOCUMENTS

| | | | |
|---|---|---|---|
| 1,185,735 | 6/1916 | Trood | 73/861.02 |
| 2,082,539 | 6/1937 | Fischer | 73/861.75 |
| 3,152,311 | 10/1964 | Bojarsiti | 336/135 |
| 3,173,003 | 3/1965 | Muller-Girard | 73/861.02 |
| 4,073,189 | 2/1978 | Draper | 73/861.76 |
| 4,112,404 | 9/1978 | Boushey | 336/135 |

OTHER PUBLICATIONS

Handbook of Chemistry and Physics published by Chemical Rubber Publishing Co., 40th Ed., 1958-1959, pp. 2448-2453.

Primary Examiner—Herbert Goldstein
Attorney, Agent, or Firm—Larson and Taylor

[57] ABSTRACT

A flowmeter utilizing the property of dry saturated steam that the density of the steam is dependent upon the temperature thereof has a first sensor that is a rotation sensor (1) which includes a flap (14) which is disposed in a steam flow passage (12) to be deflected by steam flow so as to rotate a rotatable member (4) of the rotation sensor, and a second sensor that is a temperature sensor (20) for sensing the temperature of the flowing steam. Signals from these two sensors (1, 20) which are, respectively, dependent upon steam flow, and steam temperature and hence density, are processable in process means for obtaining the true mass flow rate of the steam. For other fluids, such as superheated steam, the flowmeter has a third sensor which is a pressure transducer, signals from the three sensor being processable in process means for obtaining the true mass flow rate. The flap (14) is connected to the rotatable member (4) of the rotation sensor through an opening in an otherwise sealed enclosure (8), the sealing being effected by a sealing ring (40) that is disposed between parts, a body (10) and a base plate (38), which are stationary relative to one another.

6 Claims, 3 Drawing Sheets

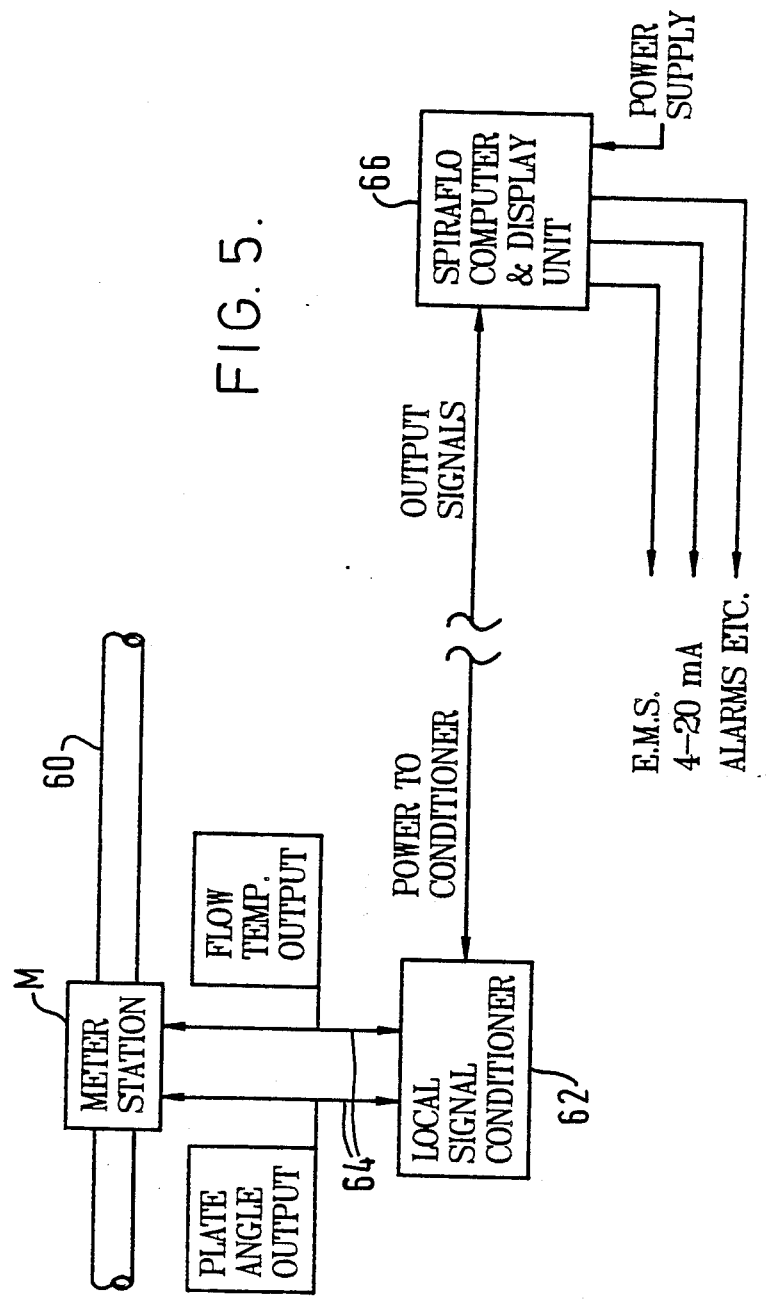

FLOWMETERS

This invention relates to flowmeters.

The flowmeter hereinafter described in detail incorporates a rotation sensor for obtaining a signal dependent upon the flow rate of a fluid, the constructional principles of which will first be described with reference to FIGS. 1(a), (b) and (c) of the accompanying drawings, these Figures being diagrammatic representations of the rotation sensor in different operative conditions.

The rotation sensor 1 shown in FIGS. 1(a), (b) and (c) comprises two ferromagnetic members 2 and 4, of which the member 2 is in the form of a ring and the member 4 is in the form of a core which is rotatable about an axis 6 coinciding with the central axis of the ring 2. Three coils P, S1 and S2 are fixed with respect to the ring 2, and are spaced apart from one another around the axis 6. The coil P is a primary coil to which power is supplied in operation. The coils S1 and S2 are secondary coils, which are connected to voltage detectors for providing signals representing the EMF's generated in them when power is supplied to the primary coil P.

It will be appreciated from FIGS. 1(a), (b) and (c) that the core is asymmetric with respect to the rotary axis 6, being semi-circular in cross-section.

FIG. 1(a) shows the sensor in an intermediate position. The cross-section of the core 4 is disposed symmetrically with respect to a plane bisecting the angle between the secondary coils S1 and S2. Consequently, the magnetic coupling between the core 4 and the outer ring 2 takes place equally through the coils S1 and S2. The voltage generated in these secondary coils is therefore equal, and the voltage difference is therefore zero.

If the core 4 is rotated from the intermediate position in the anti-clockwise direction, as shown in FIG. 1 (b), the effective air gap between the core 4 and the second coil S1 is reduced, while that between the core 4 and the secondary coil S2 is increased. Consequently, the coupling through the secondary coil S1 is greater than that through the secondary coil S2, with the result that the voltage across the coil S1 increases and that across the secondary coil S2 decreases. The magnitude of the voltage difference provides an indication of the angle of turn of the core 4. FIG. 1 (c) shows the position when the core 4 rotates in the clockwise direction from the intermediate position, and it will be appreciated that, in this case, the voltage in the secondary coil S2 becomes greater than that in the secondary coil S1. Thus, the direction of rotation of the core 4 can be detected by determining which of the coils S1 and S2 provides the greater voltage, or the polarity of the voltage difference.

Although a rotation sensor as just described, if coupled to a member moving with fluid flow in a flow line (as hereinafter described) can be used to obtain a signal that is dependent upon the rate of fluid flow, the true mass flow rate of the fluid will be dependent upon the density of the fluid. Thus, where an accurate determination of the true mass flow rate is required, it is not sufficient merely to sense the movement of a member moving in dependence upon the flow rate.

According to the present invention there is provided a flowmeter comprising first and second sensors, the first sensor comprising a flowrate transducer adapted to provide a signal which is dependent upon the flow rate through a flow passage and the second sensor comprising a temperature sensor for providing a signal that is dependent upon the temperature of fluid flowing in the passage, the flowmeter further comprising process means for receiving the signals from the first and second sensors and for deriving from those signals an output signal representing the true mass flowrate of the fluid flowing.

The flowrate transducer may comprise a variable aperture device provided with a rotation sensor responsive to the aperture size. For example, the rotation sensor may have two ferromagnetic members which are rotatable relatively to each other about an axis, a primary coil and a plurality of secondary coils, the coils being spaced apart from one another about the axis, the primary coil being coupled to the secondary coils through two separate magnetic paths each including the two members, and the coils being disposed so that relative rotation between the members varies the relative magnetic coupling between the primary coil and the respective secondary coils thereby to provide a signal that is dependent upon the relative positions of the two members. The variable aperture device may comprise a flap disposed in the flow passage of the flowmeter so as to be movable against a bias by fluid flowing through the flow passage, the flap being coupled to one of said members so as to rotate that member relatively to the other of said members upon movement of the flap.

A flowmeter in accordance with the present invention is suitable for measuring the true mass flow rate of dry saturated steam, such as is used in steam process lines, since the density of dry saturated steam is dependent upon the temperature of the steam and hence signals dependent upon flow rate and temperature can be processed to obtain the true mass flow rate. For other fluids where it is necessary also to know the pressure of the fluid, for example superheated steam, a third sensor for providing a signal that is dependent upon the pressure of the fluid flowing in the passage is provided.

Where the flowmeter is to be used in a hostile environment such as a steam flow line it is advantageous for the two members of the rotation sensor to be hermetically isolated from each other in a manner which does not interrupt the magnetic path through the members. To this end the members can comprise a stationary outer ring on which the coils are mounted, and an inner core which is the member connected to the flap. The flow passage is formed in a body to which the outer ring and the coils are secured, with the core situated in an enclosure of a non-magnetic material isolating the core from the outer ring and the coils. The enclosure is made from stainless steel and is in the form of a tube which is coaxial with the core. This tube is plugged at one end and sealed at the other end within an opening in a base plate on which the coils and the outer ring are mounted. The base plate has an opening through which extends a connecting member connecting the flap to the core, the base plate engaging the body in a fluid-tight manner to prevent communication between the opening and the ambient surroundings.

For a better understanding of the invention, and to show how it may be carried into effect, reference will now be made, by way of example, to the remaining Figures of the accompanying drawings, in which:

FIGS. 1(a), 1(b) and 1(c), as described above, are diagrammatic representations of the rotation sensor under three different operative conditions.

FIG. 5 is a diagram representing a measuring system utilizing the flowmeter of FIG. 4.

Figure 1:
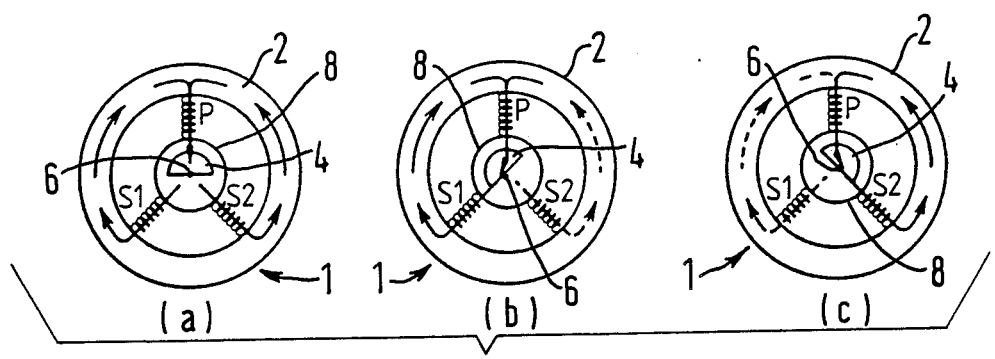

The principle of the rotation sensor 1 of the present flowmeter 3 has been described above with reference to FIGS. 1(a), (b) and (c). As incorporated in the present flowmeter, the rotation sensor 1 has its core 4 hermetically isolated from the ring 2 and the coils P, S1 and S2 by a non-magnetic enclosure 8, in the form of a stainless steel tube.

Figure 2:
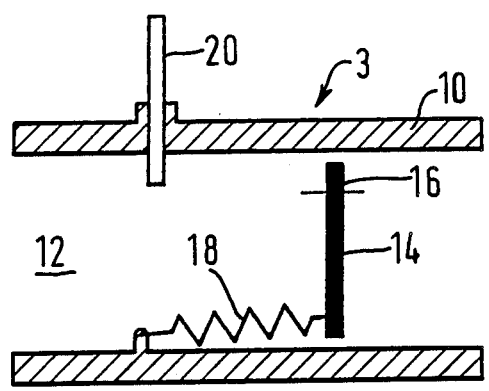
FIG. 2 is a diagrammatic sectional view of a flowmeter in a position corresponding to zero flow.
Figure 3:
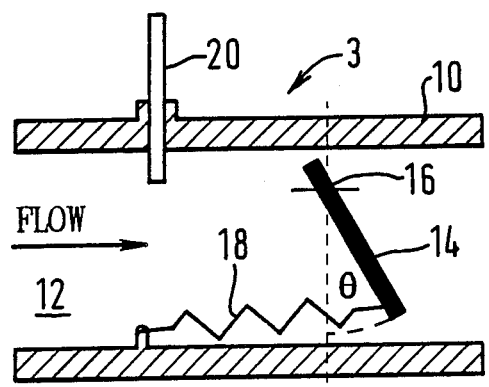
FIG. 3 shows the flowmeter of FIG. 2 when flow is taking place.

FIGS. 2 and 3 represent the operation of the rotation sensor 1 of the flowmeter 3. The rotation sensor 1 is in a part of a body 10 of the flowmeter that defines a flow passage 12. A flap 14 is mounted in the passage 12 for pivotal movement about an axis which extends transversely of the passage 12 and which is spaced from the center line of the passage 12. Resilient means in the form of a spring 18 is provided to bias the flap 14 into the position shown in FIG. 2.

In addition to the rotation sensor 1, a temperature sensor 20 is provided for detecting the temperature of the fluid flowing in the passage 12.

Although not shown in FIGS. 2 and 3, in some circumstances there is also provided a pressure transducer in the flow passage 12, at approximately the same position as the temperature sensor 20.

The flap 14 is connected by an appropriate linkage (not shown in FIGS. 2 and 3) to the core 4. Consequently, displacement of the flap 14 against the action of the spring 18 will generate an output from the rotation sensor, in the manner described with reference to FIGS. 1(a), (b) and (c), in the form of a voltage difference between the secondary coils S1 and S2. The magnitude of this voltage difference will be a function of the angle of deflection $\theta$ of the flap 14, and thus of the flow rate through the passage 12.

FIG. 2 represents the condition of the flap 14 when no flow takes place in the passage 12. When flow takes place, as shown in FIG. 3, the pressure of the flowing fluid deflects the flap 14 against the force of the spring 18. At a given value of density the angle of deflection $\theta$ is a function of both volume and mass flowrates, and consequently the output from the rotation sensor 1, when suitably calibrated, will provide a measure of the volume and mess flowrates in the passage 12. However, as discussed above, in order to obtain the true mass flow rate of the fluid in the passage 12 at any other density, it is necessary to know not only the angle $\theta$, but also the density of the flowing fluid. Where the fluid is saturated steam, the density value can be derived from the temperature of the steam, as measured by means of the sensor 20. This sensor 20 may, for example, be a platinum resistance thermometer. For other fluids, for example superheated steam, it is necessary also to know the pressure of the fluid, and the pressure transducer mentioned above would be provided for this purpose.

Figure 4:
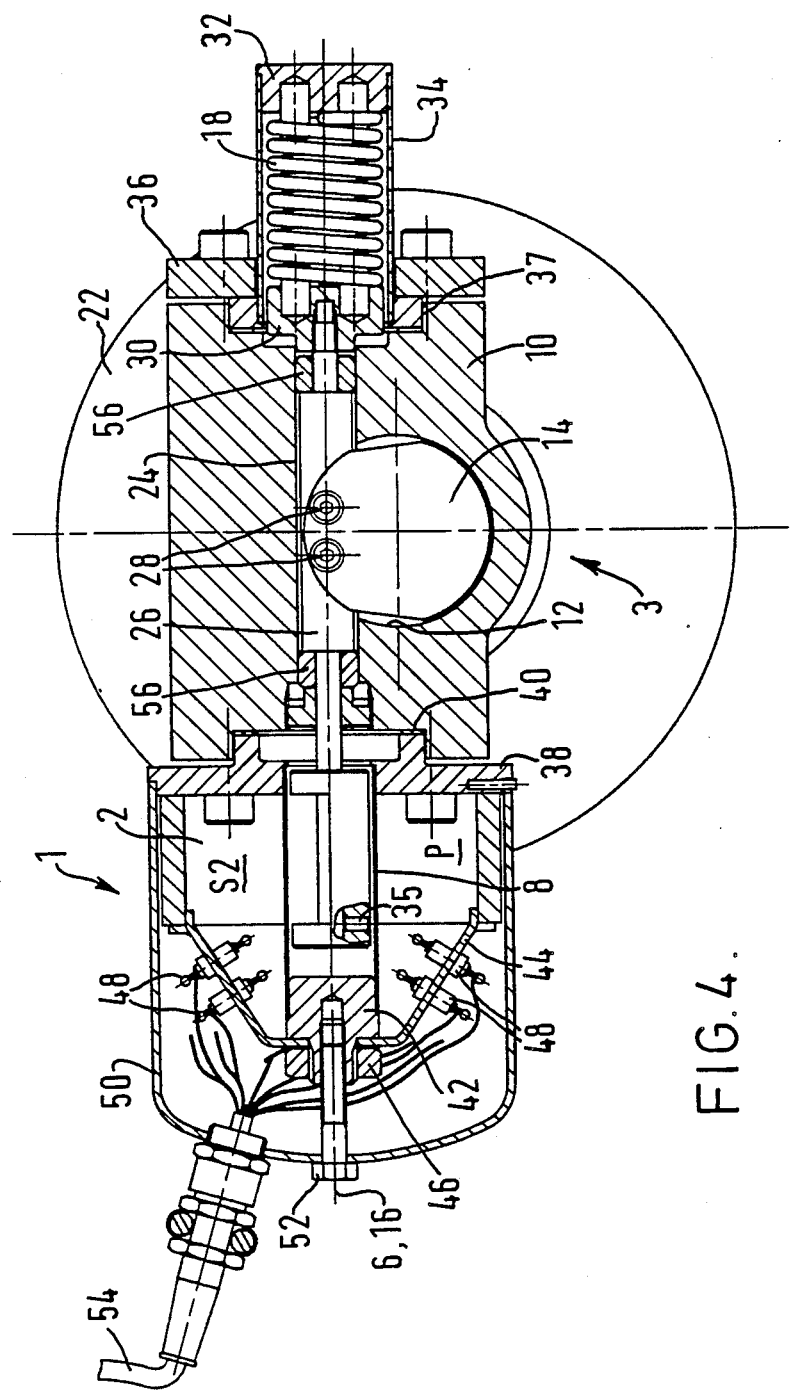
FIG. 4 is a sectional view of a practical embodiment of a flowmeter utilizing the principle shown in FIGS. 2 and 3 and including a rotation sensor utilizing the principle shown in FIG. 1.

FIG. 4 is a cross-sectional view of a practical embodiment of a flowmeter 3 utilising the features described with reference to FIGS. 1 to 3. Features which correspond to features discussed above with reference to FIGS. 1 to 3 are designated by the same reference numerals.

As shown in FIG. 4, the body 10 of the flowmeter 3 is provided with flanges 22 (only one shown in FIG. 4) for connecting the body in a steam line. As well as the passage 12, the body is provided with a transverse bore 24 within which a pivot shaft 26 is mounted. The flap 14 is secured to the pivot shaft 26 by machine screws 28. At one end, the shaft 26 projects from the body 10 and is rotationally fixed to a fitting 30. The spring 18 is a torsion spring with one end anchored in the fitting 30 and the other end anchored in an end cap 32 of a cylindrical sleeve 34. The sleeve 34 is fixed to a plate 36 which is secured to the body 10, a sealing ring 37 being provided to prevent leakage of fluid from the passage 12 through the bore 24 and between the body 10 and the plate 36.

The core 4 is secured to the other end of the shaft 26. The core 4 is accommodated in the enclosure 8, which is a stainless steel tube that is a fluid-tight fit in an opening in a base plate 38. The base plate 38 is mounted on the body 10 such that the bore 24 and the interior of the enclosure 8 are in communication with each other. A sealing ring 40 prevents leakage from the interior of the enclosure 8 to the ambient surroundings. The end of the enclosure 8 away from the body 10 is closed by a plug 42.

It will be appreciated that the interior of the enclosure 8 and the bore 24 together constitute a chamber which communicates with the passage 12 but is sealed from the outside by the seals 37 and 40. The shaft 26 and the core 4 are disposed within this chamber, and consequently there is no need for any sealing means to be provided to prevent leakage past the shaft 26 or the core 4. All necessary sealing is provided by the seals 37 and 40, which are disposed between parts which are stationary relatively to each other.

The coils P, S1 and S2, and the outer ring 2, are fixed to the base plate 38. A bracket 44 is secured to the plug 42 by a nut 46, this bracket 44 supporting terminals 48 for providing electrical connections to the coils P, S1 and S2 and the temperature probe. A casing 50 is secured to the base plate 38 by a bolt 52 which engages the plug 42. The casing 50, with the base plate 38, thus provides a housing for the ring 2, the coils P, S1 and S2, and the terminals 48. The casing 50 is made from a material which will isolate the coils S1 and S2 from stray electrical and magnetic fields which might otherwise generate spurious signals. A cable 54 enters the casing 50 through a fitting 56 which is secured to the casing 50. This cable 54 includes leads for supplying power to the primary coil P and the temperature probe and for conducting output signals from the secondary coils S1 and S2 and from the temperature sensor 20.

The dimensions of the components of the rotation sensor 1, and their electrical characteristics, are selected to give an approximately linear relationship between the angle of rotation and the voltage difference between the secondary coils S1 and S2 over a range of approximately 40°, i.e. over ±20° from the central position shown in FIG. 1(a).

Carbon bearings 56 are provided between the shaft 26 and the bore 24 to reduce friction. Fluid can pass the bearing 56 on the left as shown in FIG. 4 to enter the enclosure 8 but is otherwise prevented from escaping from the device. In particular, the fluid is not able to come into contact with the coils P, S1 and S2, nor with the terminals 48, so avoiding any possibility of corrosion or other damage to these components by the fluid. This precaution is particularly important when dealing with saturated steam at high temperature. It will be appreciated that the isolation of the fluid line from the electrical component of the rotary sensor is accomplished without the need for any rotary seal.

In the embodiment shown in FIG. 4, the normal maximum angle $\theta$ of the flap 14 is 40°. However, the flap 14 is able to pivot through an angle greater than 40° to avoid damage to the device should it be subjected to flow rates in excess of the maximum rated value. Also, it is possible for high velocity water slugs to strike the flap 14, and the ability of the flap to deflect will avoid any damage from such slugs.

The temperature sensor is not visible in FIG. 4 but is in a platinum resistance thermometer mounted so as to project into the passage 12 upstream of the flap 14.

FIG. 5 represents an installation employing the flowmeter of FIG. 4. The flowmeter M is shown in a steam line 60 for saturated steam. The flowmeter M is connected to a local signal conditioner 62 by means of a single high temperature screened eight core cable. The local signal conditioner is preferably positioned within two or three meters of the measuring device M so that the connecting cable 64 can be kept short to minimise susceptibility to electrical interference. The function of the local signal conditioner 62 is to provide power to the primary coil P of the rotation sensor 1 and to the platinum resistance thermometer that is the temperature sensor 20. It also receives the output from the secondary coils S1 and S2, and from the platinum resistance thermometer and conditions them to generate low voltage frequency modulated current signals. These signals are delivered to a computer and display unit 66. The computer and display unit 66 processes the signals from the rotation sensor 1 and the temperature sensor 20 to provide the true mass flow rate. To this end, the computer contains a complete set of steam tables so that the measured temperature signal is used to determine the instantaneous steam density. With flap angle and steam density determined, the computer performs the relevant computation to provide a display of the true mass flow rate.

It will be appreciated that where a third sensor such as a pressure transducer is provided, the computer processes in addition the signal therefrom to provide a display of the true mass flow rate.

The unit 66 may be programmed to display not only flow rates but also pressure, temperature, peak values, interval times and batch quantities. In addition, the unit 66 may be connected to a central energy management system to enable complete supervision of the process steam consumed throughout the plant concerned. For this purpose, the flowmeter M shown in FIG. 5 may be one of many similar flowmeters at different stations throughout the installation, all of these flowmeters being connected to the unit 66.

A flowmeter in accordance with the present invention can be manufactured at low cost in a robust manner. An important feature of the embodiment of FIG. 4 is that, since there is no need for moving parts to pass through the wall of the pressurised system, it is not necessary to seal between relatively movable parts. Furthermore, all electrical equipment is isolated from the pressurised system, so that it is protected from the possibly aggressive fluid in the system. Consequently, the device is reliable and requires little maintenance, so that it may be economically viable for use at many locations in a fluid supply system.

It will be appreciated that the proposed design of flow sensor will have a non-linear output. The computer and display unit contains mathematical routines to obviate this apparent disadvantage.

I claim:

1. A flowmeter comprising:

a body;

a flow passage provided in the body;

a first sensor comprising a flow rate transducer adapted to provide a signal which is dependent upon the flow rate through the flow passage;

a second sensor comprising a temperature sensor for providing a signal that is dependent upon the temperature of fluid flowing in the flow passage; and process means for receiving the signals from the first and second sensors and for deriving from those signals an output signal representing the true mass flow rate of the fluid flowing;

the flow rate transducer comprising:

a stationary ferromagnetic outer ring mounted on the body;

a ferromagnetic inner core which is rotatable relatively to the outer ring about an axis;

a primary coil and a plurality of secondary coils mounted on the outer ring, the coils being spaced apart from one another about the axis, the primary coil being coupled to the secondary coils through two separate magnetic paths each including the outer ring and the inner core, and the coils being disposed so that relative rotation of the inner core varies the relative magnetic coupling between the primary coil and the respective secondary coils thereby to provide a signal that is dependent upon the position of the inner core;

a flap disposed in the flow passage of the flowmeter so as to be movable against a bias by fluid flowing through the flow passage, the flap being coupled to the inner core so as to rotate the inner core relatively to the outer ring upon movement of the flap; and a tubular enclosure accommodating, and coaxial with, the core, the enclosure being plugged at one end and sealed at the other end with respect to the body, the enclosure being open at this other end to the flow passage but otherwise sealed so that the core is hermetically sealed from the outer ring.

2. A flowmeter as claimed in claim 1, wherein the core is secured to a shaft that extends across the flow passage and which carries the flap.

3. A flowmeter as claimed in claim 2, wherein at its end remote from the core the shaft is acted upon by a torsion spring that is housed in a closed sleeve that is sealed other than at the anchorage of the spring to the shaft.

4. A flowmeter as claimed in claim 1, wherein each seal is at surfaces which are stationary relative to each other.

5. A flowmeter as claimed in claim 1, wherein the outer ring and the primary and secondary coils are mounted on a base plate fitted to the body, the enclosure being sealed at its said other end in an opening in the base plate.

6. A flowmeter for saturated steam comprising:

a body;

a flow passage provided in the body;

a first sensor comprising a flowrate transducer adapted to provide a signal which is dependent upon the flow rate of saturated steam through the flow passage;

a second sensor comprising a temperature sensor for providing a signal that is dependent upon the temperature of saturated steam flowing in the flow passage; and process means for receiving the signals from the first and second sensors and for deriving from those signals alone an output signal representing the true mass flow rate of the saturated steam;

the flow rate transducer comprising:

a stationary ferromagnetic outer ring mounted on the body;

a ferromagnetic inner core which is rotatable relatively to the outer ring about an axis;

a primary coil and a plurality of secondary coils mounted on the outer ring, the coils being spaced apart from one another about the axis, the primary coil being coupled to the secondary coils through two separate magnetic paths each including the outer ring and the inner core, and the coils being disposed so that relative rotation of the inner core varies the relative magnetic coupling between the primary coil and the respective secondary coils thereby to provide a signal that is dependent upon the position of the inner core;

a flap disposed in the flow passage of the flowmeter so as to be movable against a bias by saturated steam flowing through the flow passage, the flap being coupled to the inner core so as to rotate the inner core relatively to the outer ring upon movement of the flap; and a tubular enclosure accommodating, and co-axial with, the core, the enclosure being plugged at one end and sealed at the other end with respect to the body, the enclosure being open at this other end to the flow passage but otherwise sealed so that the core is hermetically sealed from the outer ring.

* * * * *